(12) United States Patent (10) Patent No.: US 7,920,864 B2
Kurita et al. (45) Date of Patent: Apr. 5, 2011

(54) MOBILE COMMUNICATION SYSTEM, SWITCHING CENTER SERVER AND ADDITIONAL SERVICE PROVIDING METHOD USED FOR THE SAME

(75) Inventors: Shigeharu Kurita, Tokyo (JP); Masato Ohnishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1002 days.

(21) Appl. No.: 11/800,578

(22) Filed: May 7, 2007

(65) Prior Publication Data

US 2007/0270144 A1 Nov. 22, 2007

(30) Foreign Application Priority Data

May 17, 2006 (JP) ................................ 2006-137147

(51) Int. Cl.
*H04W 4/00* (2009.01)
*H04M 3/42* (2006.01)
(52) U.S. Cl. ................ 455/435.1; 455/432.2; 455/414.1
(58) Field of Classification Search .............. 455/435.1, 455/432.2, 414.1
See application file for complete search history.

(56) References Cited

U.S. PATENT DOCUMENTS

| 2003/0027569 A1* | 2/2003 | Ejzak ........................... 455/432 |
| 2003/0027595 A1 | 2/2003 | Ejzak |
| 2004/0249887 A1* | 12/2004 | Garcia-Martin et al. ..... 709/204 |
| 2006/0077948 A1 | 4/2006 | Asahina |
| 2006/0268900 A1 | 11/2006 | Larsson et al. |

FOREIGN PATENT DOCUMENTS

| GB | 2 398 458 A | 8/2004 |
| JP | 2007-060181 | 3/2007 |
| WO | WO 03/061177 A3 | 7/2003 |
| WO | WO 2006/038099 A3 | 4/2006 |

OTHER PUBLICATIONS

3GPP TS 24.088 vol. 6.0.0 (Mar. 2003), $3^{rd}$ Generation Partnership Project; Technical Specification Group Core Network; Call Barring (CB) Supplementary Service-Stage 3 (Release 6).
3GPP TS 24.081 vol. 6.0.0 (Dec. 2004) $3^{rd}$ Generation Partnership Project: Technical Specification Group Core Network; Line Identification Supplementary Services-Stage 3 (Release 6).

* cited by examiner

*Primary Examiner* — Jinsong Hu
*Assistant Examiner* — Marisol Figueroa
(74) *Attorney, Agent, or Firm* — Scully, Scott, Murphy & Presser, P.C.

(57) ABSTRACT

The present invention provides a mobile communication system including an IP (Internet Protocol) core network, a mobile communication network, a switching center server and a mobile terminal, wherein a plurality of services in each of the IP network and the mobile communication network are provided for the mobile terminal.

15 Claims, 13 Drawing Sheets

MOBILE COMMUNICATION SYSTEM, SWITCHING CENTER SERVER AND ADDITIONAL SERVICE PROVIDING METHOD USED FOR THE SAME

INCORPORATION BY REFERENCE

This application is based upon and claims the benefit of priority from Japanese Patent Application No. 2006-137147 filed on May 17, 2006, the content of which are incorporated by reference.

BACKGROUND OF THE INVENTION

1. Field of the Invention

The present invention relates to a mobile communication system, a switching center server and an additional service providing method used for the same, more specifically to a mobile communication system, a switching center server and an additional service provided from them in SIP (Session Initiation Protocol) sequence.

2. Description of the Related Art

Recently, cellular phones, which are an example of a mobile communication service, have been significantly popular, popularizing the 3GPP: $3^{rd}$ Generation Partnership Project service, the WLAN: Wireless Local Area Network service and the like.

There is a trend of integrating all these systems into the IP (Internet Protocol) network. IMS (IP Multimedia Subsystem) is a service for providing an IP based multi media service without depending on the $3^{rd}$ generation cellular phone or the wireless LAN, enabling not only providing an IP based service but also connecting with the PSTN (Public Switched Telephone Network) or the Internet and providing a service. In the IMS network, the SIP is used as a controlling protocol.

The $3^{rd}$ generation cellular phone network includes the CS (Circuit Switched) domain that uses a conventional circuit switching network and the PS (Packet Switched) domain that uses a packet switching network. The IMS is a subsystem that is built on the PS domain, thus, the IMS is independent of the CS domain. In order to accommodate the CS service into the IMS network, the CS service needs to be converted into the PS service, i.e., a signal protocol in the CS domain needs to be converted into SIP in the PS domain.

In the above-mentioned conventional method, however, there is a difference between the calling methods. In the CS call processing between the wireless LAN and the $3^{rd}$ generation cellular phone, the call processing node at the wireless LAN side is the CSCF (Call Session Control Function), which is different from the MSC (Mobile Switching Center) that is the call processing node at the $3^{rd}$ generation cellular phone side.

As a technique for enabling the signal protocol of the above-mentioned CS domain to be converted into the SIP of the PS domain, a technique for converting a signal protocol into the SIP signal to perform handover between different radio transmissions (for example, see Japanese Patent Laid-Open No. 2007-060181), and so on, is disclosed.

As the additional service in the $3^{rd}$ generation cellular phone service, a service of the GSM (Global System for Mobile communication) standard [CF (Call Forwarding), CW (Call Waiting), CB (Call Barring, CLIR (Calling Line Identification Restriction) and so on and a service in IN (Intelligent Network) method are used. The IN method is a network intending to realize addition and extension of a service without changing a software program of an exchange by separating service controlling, management and maintenance of data relating to a service from the exchange into another node.

The above-mentioned CB and CLIR services, however, cannot be provided for the $3^{rd}$ generation cellular phone service that is accommodated in the IMS network. The existing SIP sequence at a normal occasion is shown in FIGS. 8 to 10.

Figure 8:
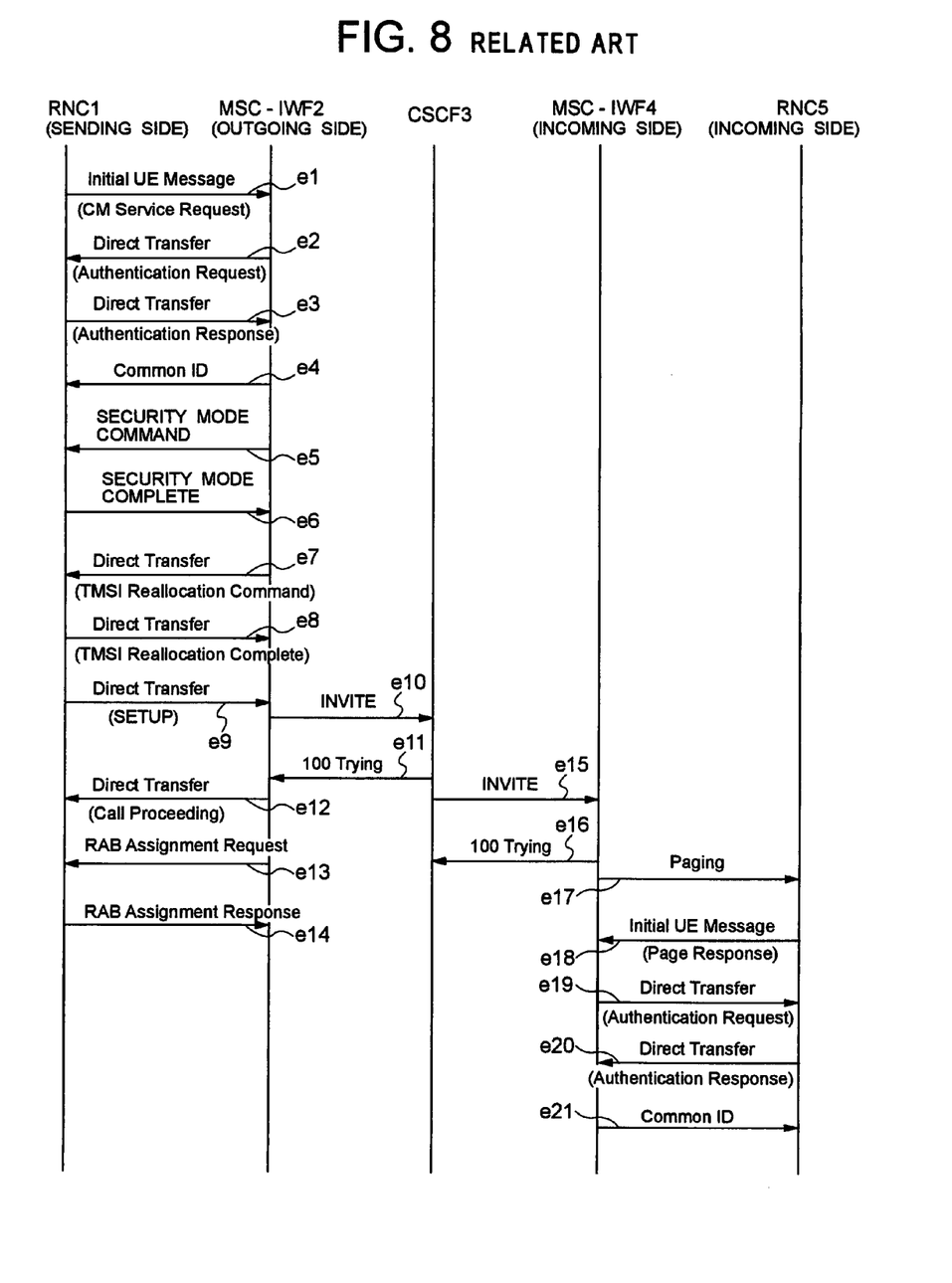
FIG. 8 is a sequence chart showing an existing SIP sequence at a normal occasion.
Figure 9:
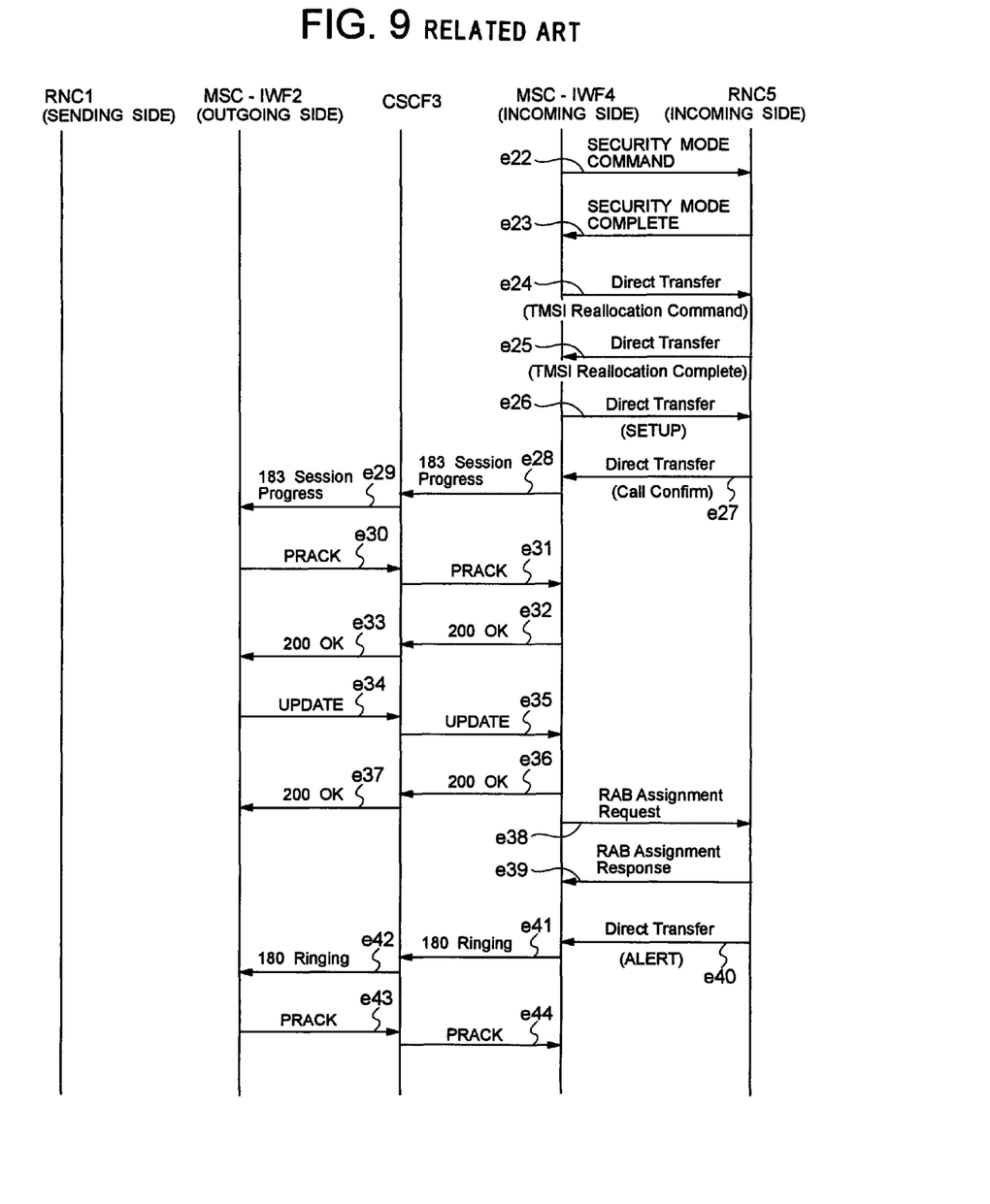
FIG. 9 is a sequence chart showing an existing SIP sequence at a normal occasion.
Figure 10:
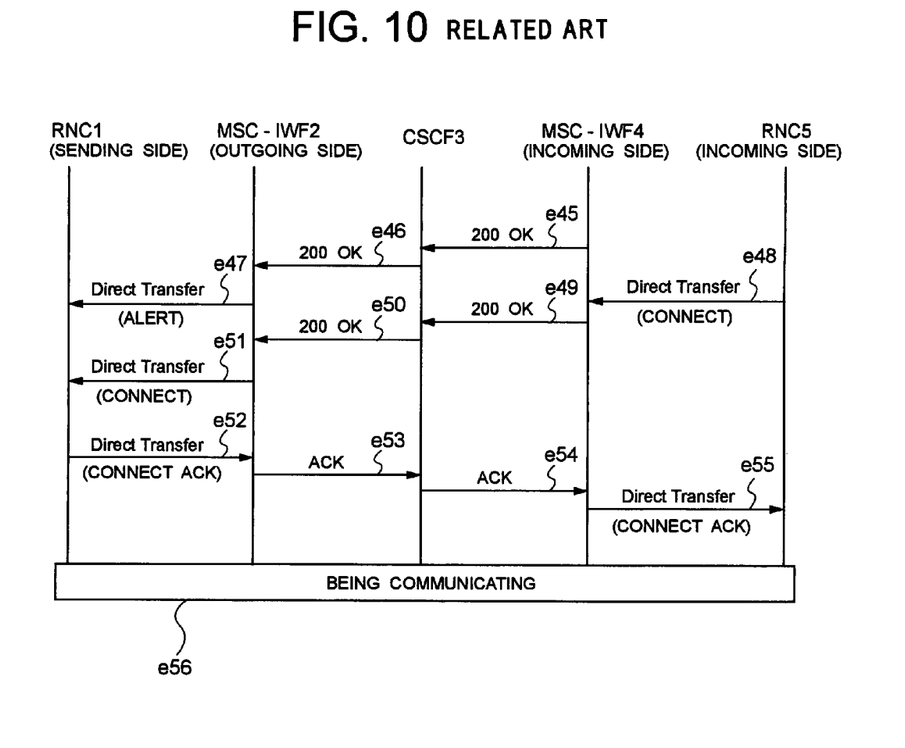
FIG. 10 is a sequence chart showing an existing SIP sequence at a normal occasion.

As shown in FIGS. 8 to 10, in the existing $3^{rd}$ generation cellular phone system, a normal-sequence and a semi-normal-sequence signal can be determined in the MSC (Mobile Switching Center) (see, e1 to e21 in FIG. 8, e22 to e44 in FIG. 9 and e45 to e56 in FIG. 10)

In the IMS network that is included in the IP system, however, the MSC-IWF (Mobile Switching Center-Inter Working Function) only converts a signal protocol from the $3^{rd}$ generation cellular phone service into the SIP, and unless the CSCF that is a device in the IMS network receives an INVITE signal [connection request (request to establish a session)], it cannot be determined.

Therefore, determination of a signal and sending timing differs between the two systems as mentioned above. Thus, the timing to send Call Proceeding (e12 in FIG. 8) for determining a normal-sequence signal becomes important. In an existing SIP sequence, however, Call Proceeding (e12 in FIG. 8) is sent from the MSC-IWF to the RNC (Radio Network Controller) in response to the 100 Trying (a temporal response representing that it is under trial), thus, under the CB or the CLIR that are a semi-normal-sequence service, a signal needs to flow in such a flow as a SETUP signal is transferred from the RNC to MSC-IWF (e9 in FIG. 8) and a RELCOMP signal (Release Complete Message) is sent from the MSC-IWF to the RNC {see, "Call Barring (CB) Supplementary Service-Stage 3" [3GPP TS24. 088 V6.0.0 (2003-03)] (Non-Patent Document 1) and "Line Identification Supplementary Service-Stage 3" [3GPP TS24.081 V6.0.0 (2004-12)] (Non-Patent Document 2)}.

In the conventional additional service, however, the Call Proceeding signal (e12 in FIG. 8) is inserted between the SETUP signal (e9 in FIG. 8) and the RELCOMP signal, which leads to a problem in that a signal cannot be mapped.

Figure 11:
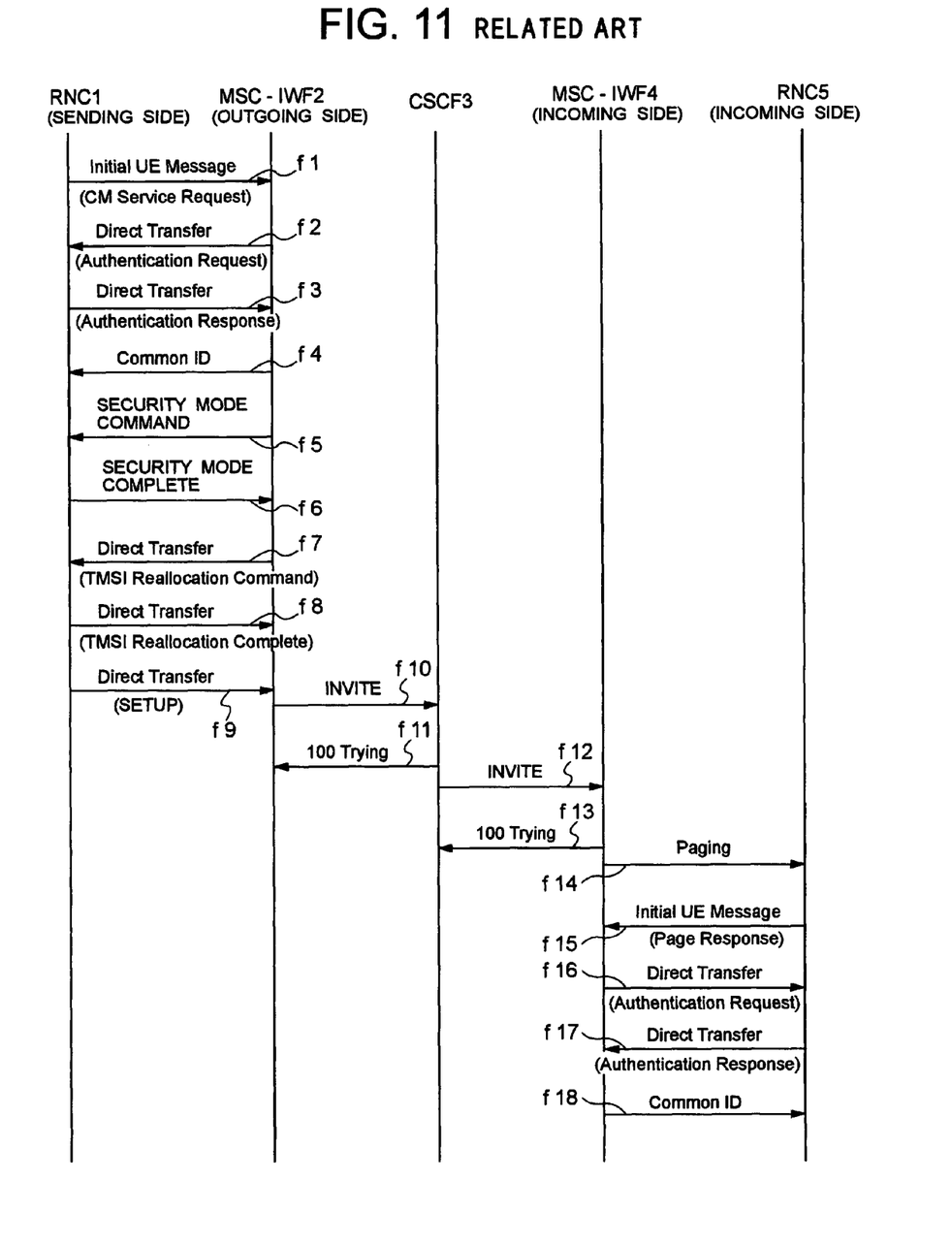
FIG. 11 is a sequence chart showing the SIP sequence by 183 signal determination at a normal occasion.
Figure 12:
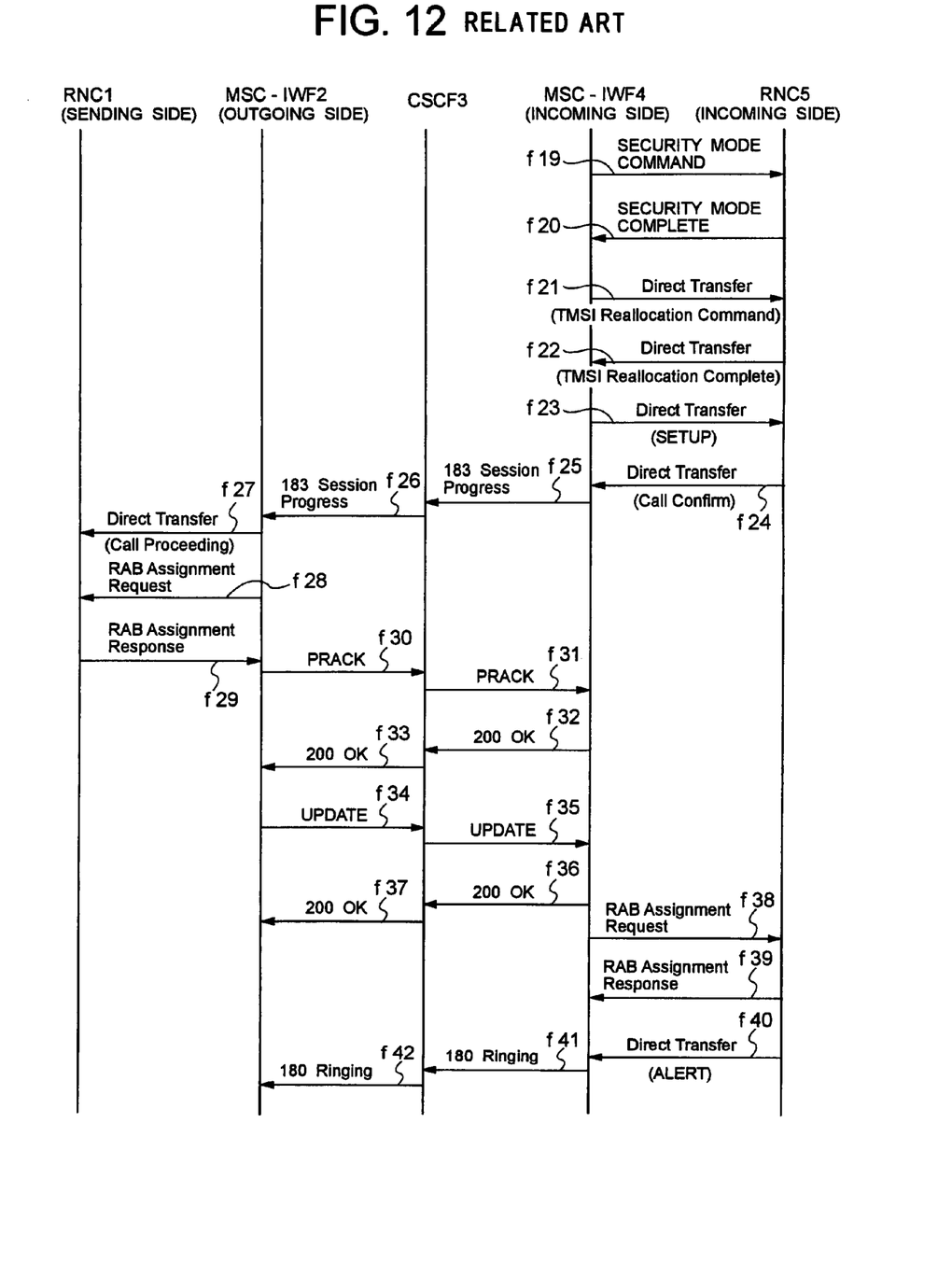
FIG. 12 is a sequence chart showing the SIP sequence by the 183 signal determination at a normal occasion.
Figure 13:
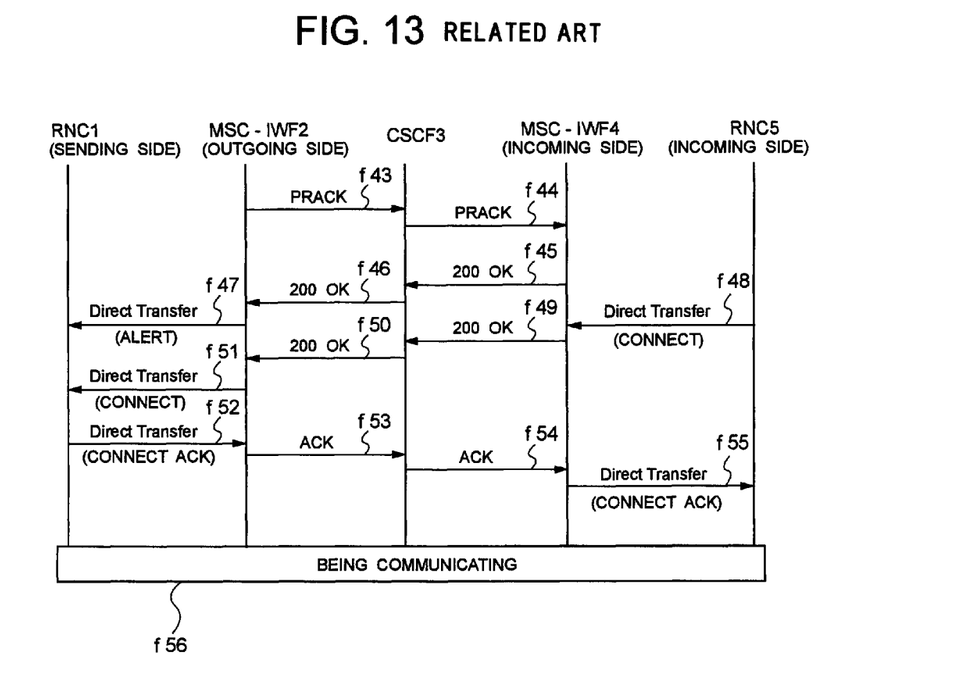
FIG. 13 is a sequence chart showing the SIP sequence by the 183 signal determination at a normal occasion.

FIGS. 11 to 13 show the SIP sequence by 183 signal determination at a normal occasion (see f1 to f18 in FIG. 11, f19 to f42 in FIG. 12, f43 to f56 in FIG. 13).

As a solution of the above-mentioned problem in the existing SIP sequence shown in FIGS. 8 to 10, when the MSC-IWF receives the 183 Session Progress signal (progress of the session) (f26 in FIG. 12) in a normal occasion and changes to send Call Processing (f27 in FIG. 12) to the RNC as shown in FIGS. 11 to 13, the processing can be normally performed on the CB or the CLIR that would not be subjected to signal mapping in the existing SIP sequence shown in FIGS. 8 to 10.

In the case of normal-sequence operations, however, authentication, concealment, setting up and so on need to be performed on the incoming side by the time when 183 Session Progress (f26 in FIG. 12) is received. That leads to a problem in that a delay occurs. That means that a delay occurs each time a user uses a service, which will degrade the service.

Then, an object of the present invention is to provide a mobile communication system that can provide the CB and the CLIR services that solve the above-mentioned problems without affecting an existing service, a switching center server and an additional service providing method used for the same.

BRIEF SUMMARY OF THE INVENTION

An exemplary aspect of the invention is a mobile communication system including an IP (Internet Protocol) core network, a mobile communication network, a switching center server and a mobile terminal, wherein a plurality of services in each of the IP network and the mobile communication network are provided for the mobile terminal.

DETAILED DESCRIPTION OF EXEMPLARY EMBODIMENTS

First Exemplary Embodiment

Figure 1:
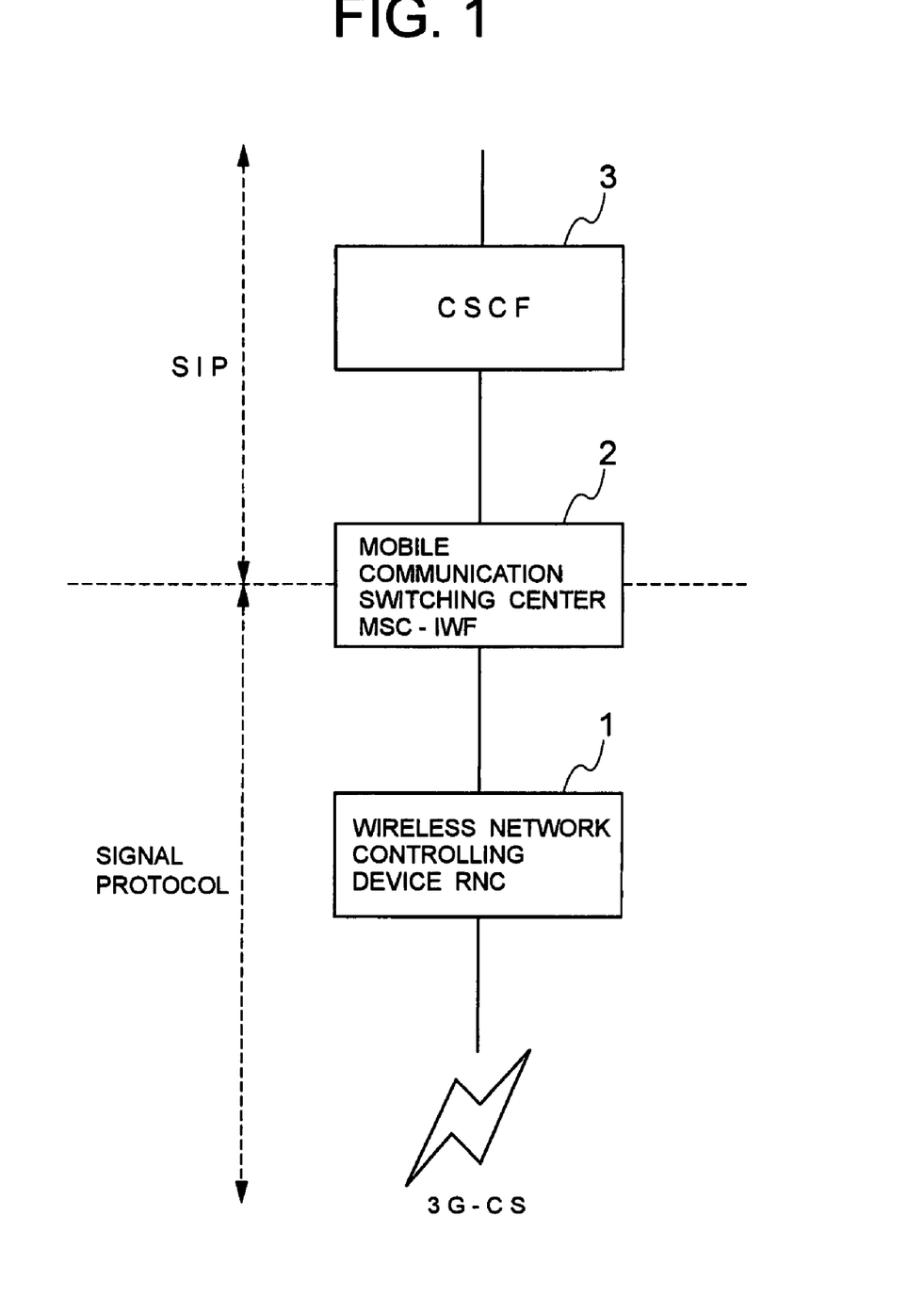
FIG. 1 is a block diagram showing a configuration of a mobile communication system according to an exemplary embodiment of the present invention.

Exemplary embodiments of the present invention will be described below with reference to the drawings. FIG. 1 is a block diagram showing a configuration of the mobile communication system according to an exemplary embodiment of the present invention. In FIG. 1, the mobile communication system according to the exemplary embodiment of the present invention includes a UE (User Equipment) which is an existing mobile terminal (not shown), an RNC (Radio Network Controller) 1 which is a controlling device of a wireless network, an MSC-IWF (Mobile Switching Center-Inter Working Function) 2, and a CSCF (Call Session Control Function) 3 which is a device in the IMS (IP Multimedia Subsystem) network.

The MSC-IWF2 is an interworking device with a function of converting the signal protocol sent from the RNC1 into the SIP (Session Initiation Protocol) and accommodates the signal protocol in the CSCF3 which is a device in the IMS network. The CSCF3 is a system connected to the PS (Packet Switched) domain for making a core network as the IP (Internet Protocol) and a device with a call control function. FIG. 1 shows that the signal protocol of the third generation mobile phone service is used from the UE to the RNC1 and the MSC-IWF2, and the SIP is used from the MSC-IWF2 to the CSCF3 for converting the signal protocol into the SIP at the MSC-IWF2.

Figure 2:
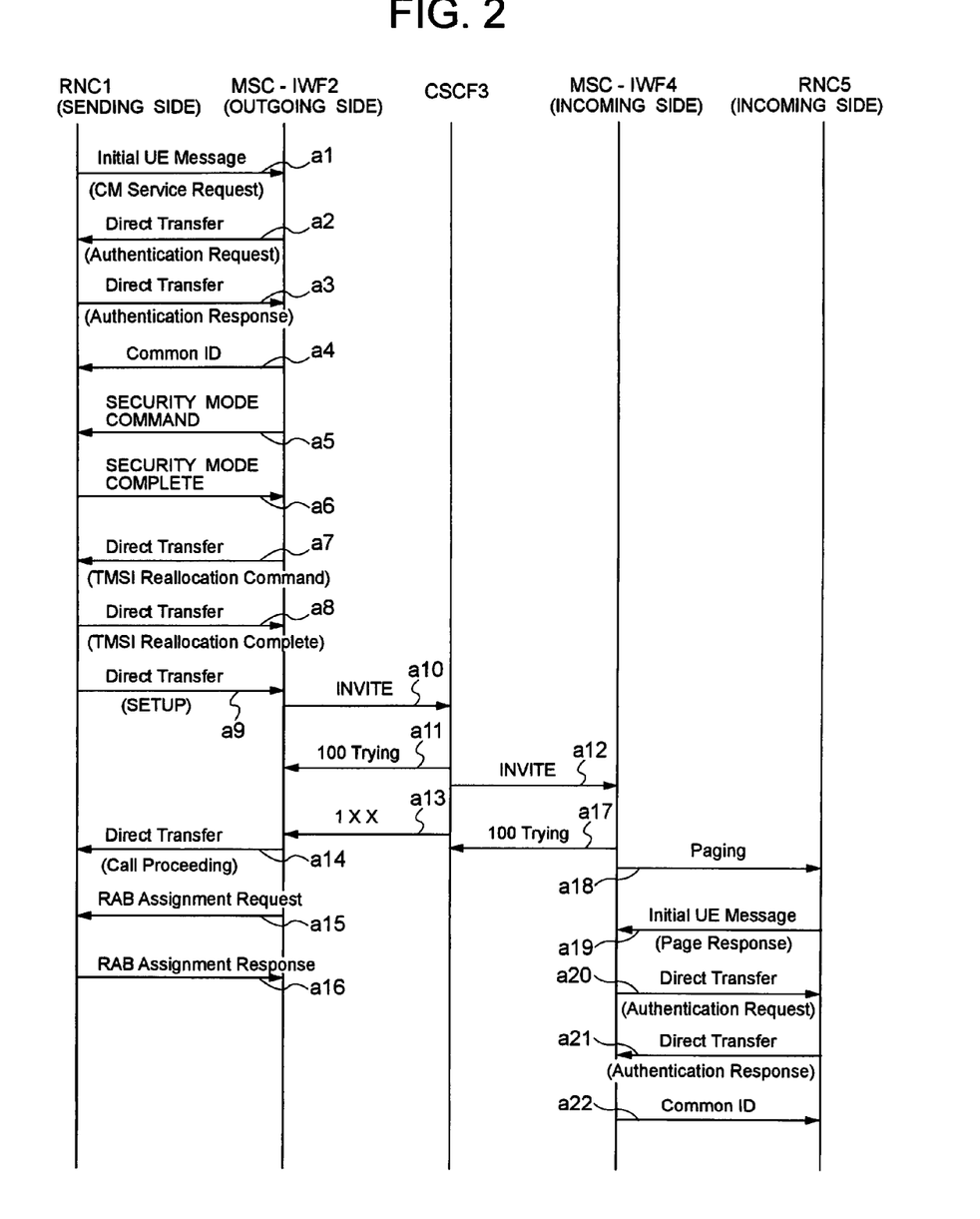
FIG. 2 is a sequence chart showing the SIP sequence at a normal occasion according to an exemplary embodiment of the present invention.
Figure 3:
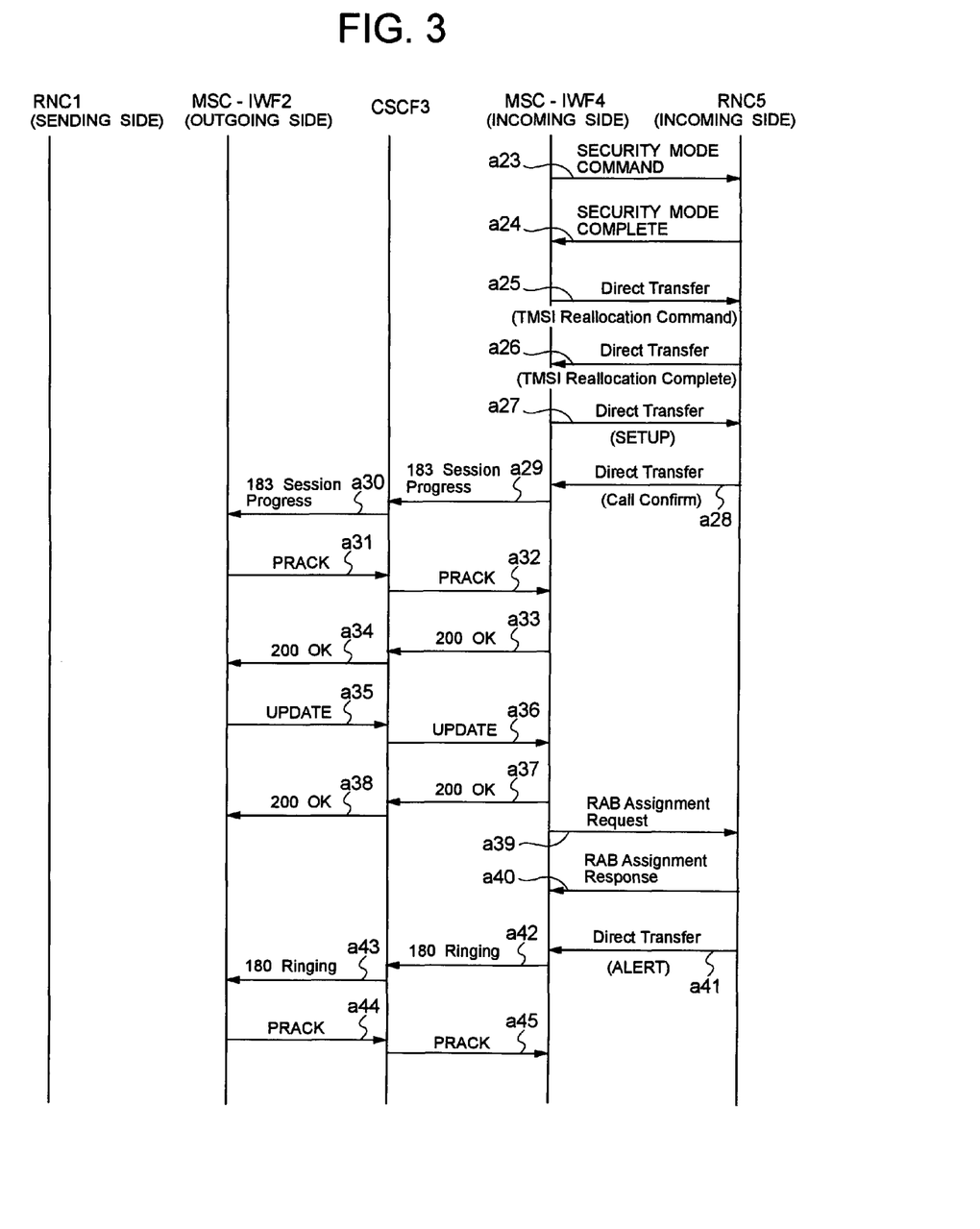
FIG. 3 is a sequence chart showing the SIP sequence at a normal occasion according to an exemplary embodiment of the present invention.
Figure 4:
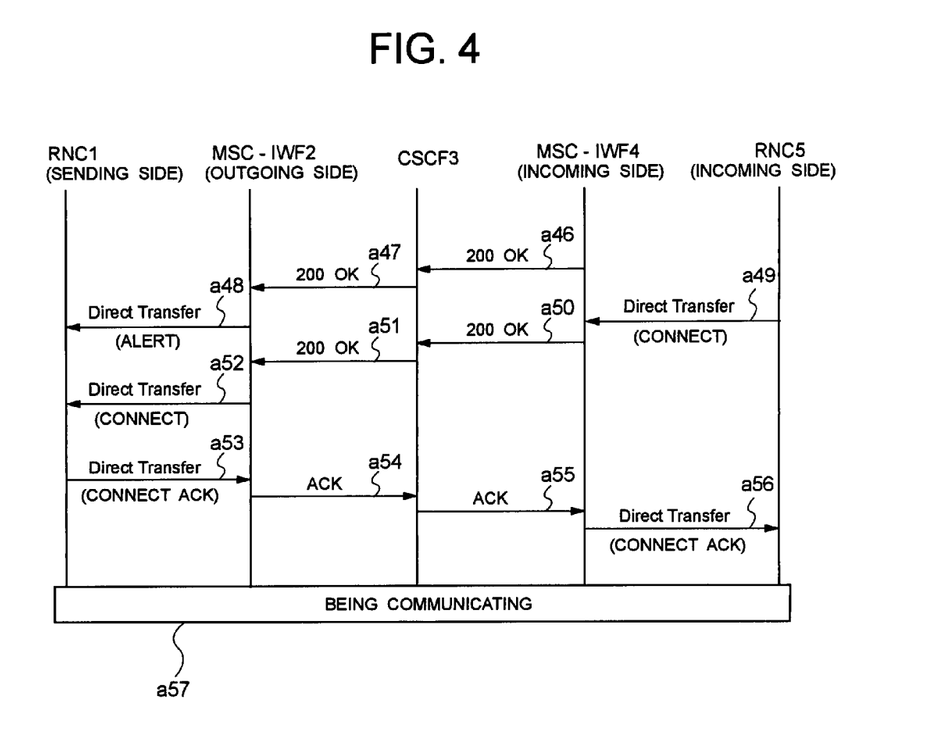
FIG. 4 is a sequence chart showing the SIP sequence at a normal occasion according to an exemplary embodiment of the present invention.

FIGS. 2 to 4 are a sequence chart for showing an SIP sequence in a normal occasion by an exemplary embodiment of the present invention. FIGS. 2 to 4 show the SIP sequence at the normal occasion when the 1XX signal is added as an exemplary embodiment of the present invention (see, a1 to a22 in FIG. 2, a23 to a45 in FIG. 3, and a46 to a57 in FIG. 4).

In the exemplary embodiment, a flow of a signal in a signal protocol at the outgoing side is shown between the RNC1 (sending side) and the MSC-IWF2 (outgoing side). A flow of the SIP signal at the outgoing side is shown between the MSC-IWF2 (outgoing side) and the CSCF3, and a flow of the SIP at the incoming side is shown between the CSCF3 and the MSC-IWF4 (incoming side). A flow of the signal protocol at the incoming side is shown between the MSC-IWF (incoming side) and the RNC5 (incoming side).

Figure 5:
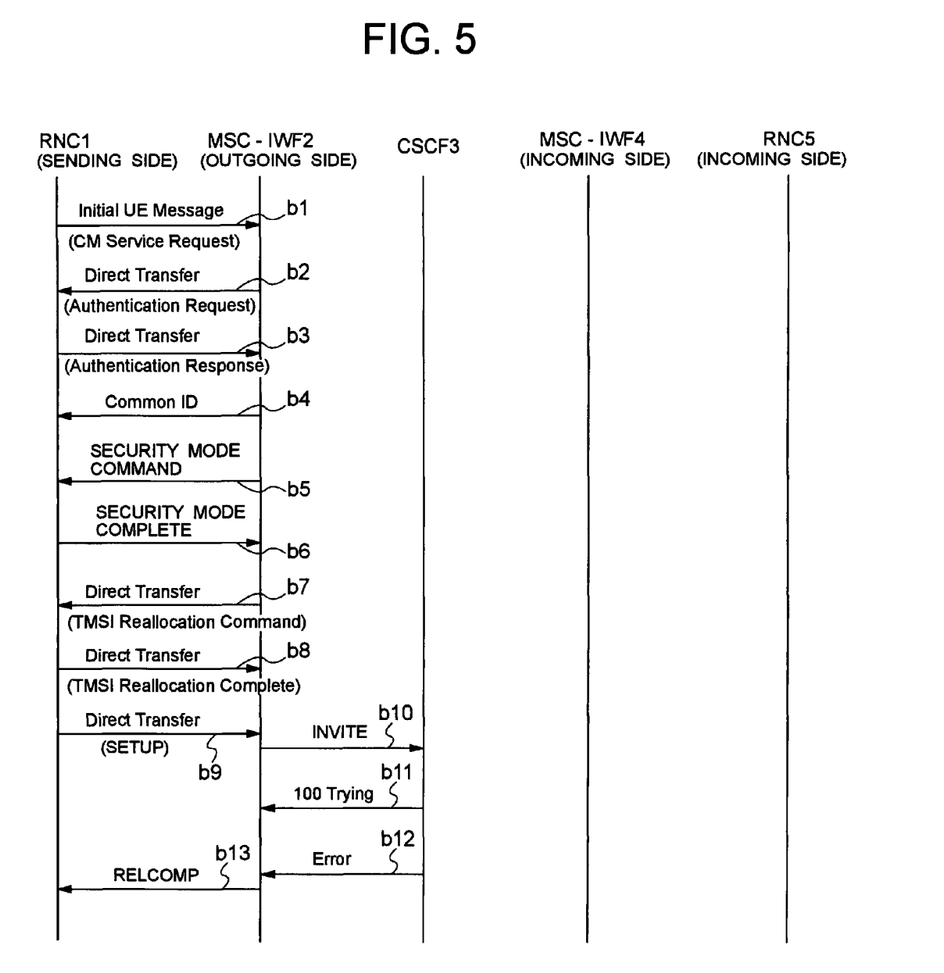
FIG. 5 is a sequence chart showing the SIP sequence at the CB and CLIR service according to an exemplary embodiment of the present invention.

FIG. 5 is a sequence chart for showing the SIP sequence at the CB (Call Barring) and the CLIR (Calling Line Identification Restriction) services according to an exemplary embodiment of the present invention. FIG. 5 shows the SIP sequence at the CB and CLIR as an exemplary embodiment of the present invention (see, b1 to b13 in FIG. 5).

In the exemplary embodiment, a flow of a signal in a signal protocol at the outgoing side is shown between the RNC1 (sending side) and the MSC-IWF2 (outgoing side) as in the above-mentioned case. A flow of the SIP signal at the outgoing side is shown between the MSC-IWF2 (outgoing side) and the CSCF3, and a flow of the SIP signal at the incoming side is shown between the CSCF3 and the MSC-IWF4 (incoming side). A flow of a signal in a signal protocol at the incoming side is shown between the MSC-IWF4 (incoming side) and the RNC5 (incoming side).

Operations of a mobile communication system according to an exemplary embodiment of the present invention will be described with reference to FIGS. 1 to 5. First, operations of the SIP sequence until sending the Call Proceeding (a14 in FIG. 2) when the response signal 1XX is added (a13 in FIG. 2) according to the exemplary embodiment of the present invention will be described with reference to FIGS. 2 to 4.

The RNC1 (sending side) sends the CM Service signal which is a request to start a service from the UE, to the MSC-IWF2 (outgoing side) (a1 in FIG. 2). In contrast, the MSC-IWF2 (outgoing side) sends an Authentication Request to the RNC1 (sending side) (a2 in FIG. 2). In response to the Authentication Request, the RNC1 (sending side) transfers the Authentication Response returned from the UE (a3 in FIG. 2). Accordingly, the authentication is completed and the MSC-IWF2 (outgoing side) sends a Common ID to the RNC1 (sending side) (a4 in FIG. 2).

Then, Security Mode (concealment) and TMSI (Temporary Mobile Subscriber Identity) Reallocation (obtainment of a new TMSI and releasing of an old TMSI) is sent and received between the RNC1 (sending side) and the MSC-IWF2 (outgoing side) (a5 to a8 in FIG. 2), and a SETUP signal is transferred from the RNC1 (sending side) to the MSC-IWF2 (outgoing side) (a9 in FIG. 2).

At this moment, the MSC-IWF2 (sending side) sends an INVITE signal [a connecting request (a request to establish a session)] to the CSCF3 (a10 in FIG. 2). The CSCF3 that receives the INVITE signal sends the 100 Trying (a provisional response indicating that it is being tried) which is a provisional response, to the MSC-IWF2 (outgoing side) (a11 in FIG. 2), and then sends the provisional response signal 1XX to the MSC-IWF2 (outgoing side) (a13 in FIG. 2). Here, the CSCF3 transfers the INVITE signal to the MSC IWF4 (incoming side) (a12 in FIG. 2), then the Call Proceeding is sent from the MSC-IWF2 (outgoing side) to the RNC1 (sending side) (a14 in FIG. 2), and the normal-sequence signal is confirmed.

As mentioned above, FIGS. 8 to 10 show an existing SIP sequence at the normal occasion and FIGS. 11 to 13 show an SIP sequence by 183 signal determination at the normal occasion. In the case of the existing SIP sequence shown in FIGS. 8 to 10, the Call Proceeding is sent from the MSC-IWF2 (outgoing side) to the RNC1 (sending side) and it is confirmed as normal processing as in the case of the SIP sequence shown in FIGS. 2 to 4.

In the case where the Call Proceeding is sent in response to the 183 Session Progress (progress of the session) shown in FIG. 12 (f27 in FIG. 12), however, after the SETUP signal is sent from the RNC1 (sending side) to the MSC-IWF2 (outgoing side) (f9 in FIG. 11), the MSC-IWF2 (outgoing side) sends the INVITE signal to the CSCF3 (f10 in FIG. 11).

The CSCF3 that has received the signal sends the 100 Trying which is a provisional response, to the MSC-IWF2 (outgoing side) (f11 in FIG. 11), and transfers the INVITE signal to the MSC-IWF4 (incoming side) (f12 in FIG. 11). In response, the MSC-IWF4 (incoming side) sends the 100 Trying which is a provisional response, to the CSCF3 (f13 in FIG. 11). Here, the MSC-IWF4 (incoming side) sends a Paging signal to the RNC5 (incoming side) (f14 in FIG. 11). In response, the RNC5 (incoming side) returns Page Response (f15 in FIG. 11).

The MSC-IWF4 (incoming side) sends the Authentication Request to the RNC5 (incoming side) (f16 in FIG. 11). In response the Authentication Request, the RNC5 (incoming side) returns the Authentication Response to the RNC5 (incoming side) (f17 in FIG. 11). With that operation, authentication is completed and the MSC-UWF4 (incoming side) sends Common ID to the RNC5 (incoming side) (f18 in FIG. 11).

Then, Security Mode, TMSI Reallocatin is sent and received between the MSC-IWF4 (incoming side) and the RNC5 (incoming side) (f19 to f22 in FIG. 12), the SETUP signal is transferred from the MSC-IWF4 (incoming side) to the RNC5 (incoming side) (f23 in FIG. 12), and the Call Confirm is sent to the MSC-IWF4 (incoming side) (f24 in FIG. 12).

Here, the 183 Session Progress signal (progress of a session) is sent from the MSC-IWF4 (incoming side) to the CSCF3 (f25 in FIG. 12), and the CSCF3 transfers the 183 Session Progress to the MSC-IWF2 (outgoing side) (f26 in FIG. 12). Accordingly, the Call Proceeding is sent from the MSC-IWF2 (outgoing side) to the RNC1 (sending side) (f27 in FIG. 12) and a normal-sequence signal is confirmed.

As such, as the setup processing at the incoming side is added in the SIP sequence shown in FIGS. 11 to 13, if the Call Proceeding (f27 in FIG. 12) is sent in response to the 183 Session Progress (f26 in FIG. 12), a delay occurs.

Now, operations of the SIP sequence at the CB and CLIR according to an exemplary embodiment of the present invention will be described with reference to FIG. 5. First, in an existing third generation mobile phone service, mapping is enabled as the SETUP signal (b9 in FIG. 5) and the RELCOMP signal (Release Complete Message) (f13 in FIG. 5) are sent in that order between the RNC1 (sending side) and the MSC-IWF2 (outgoing side) in the CB and CLIR.

Referring to FIG. 5, the SETUP signal is sent from the RNC1 (sending side) to the MSC-IWF2 (outgoing side) in the same way as shown in FIGS. 2 to 4 (b9 in FIG. 5). Here, the INVITE signal is sent from the MSC-IWF2 (outgoing side) to the CSCF3 (b10 in FIG. 5). The CSCF3 that has received the signal sends a provisional response of the 100 Trying to the MSC-IWF2 (outgoing side) (b11 in FIG. 5). As the CSCF3 detects the CB or CLIR state, it also sends the Error signal (f12 in FIG. 5). Accordingly, the RELCOMP signal is sent from the MSC-IWF2 (outgoing side) to the RNC1 (sending side) (b13 in FIG. 5) and the call is released.

Figure 6:
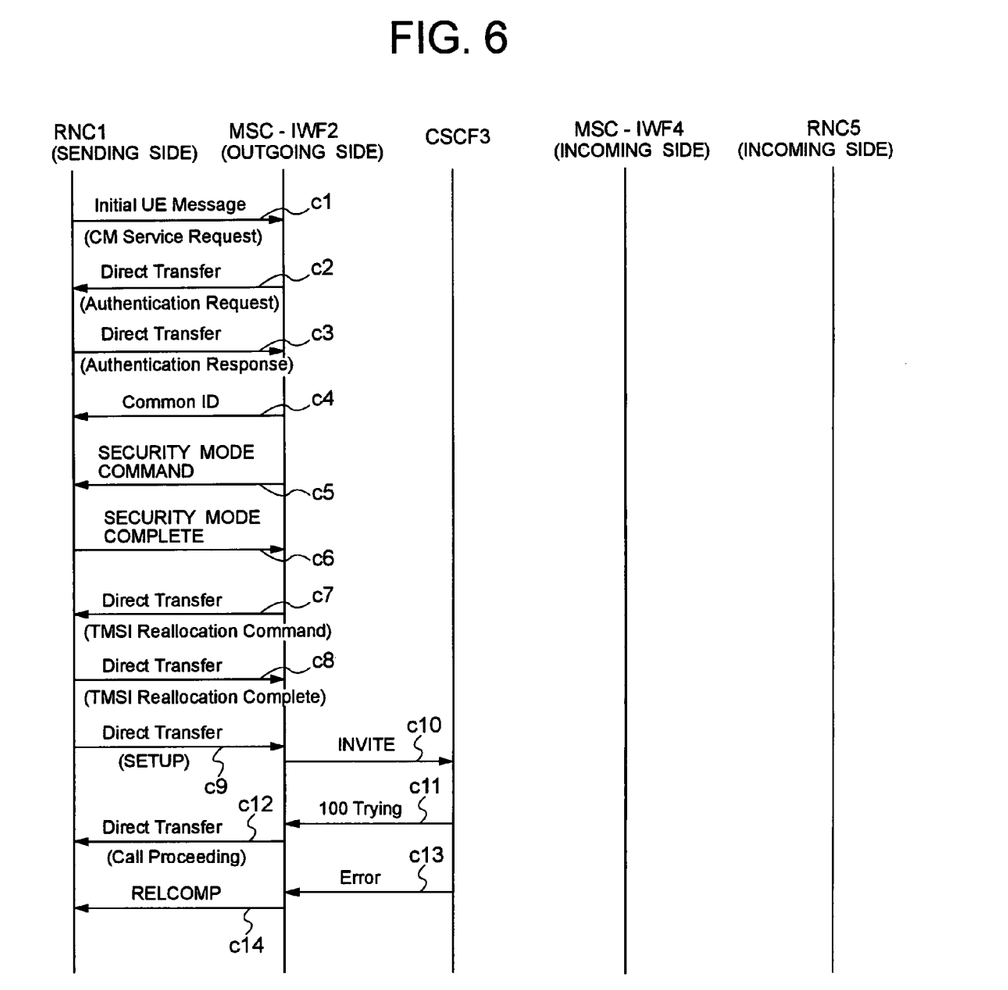
FIG. 6 is a sequence chart showing an existing SIP sequence at the CB and CLIR according to an exemplary embodiment of the present invention.

FIG. 6 is a sequence chart of an existing SIP sequence at the CB and CLIR according to an exemplary embodiment of the present invention. In FIG. 6, the SETUP signal is sent from the RNC1 (sending side) to the MSC-IWF2 (outgoing side) as in the above-mentioned case (c9 in FIG. 6). Here, the INVITE signal is sent from the MSC-IWF2 (outgoing side) to the CSCF3 (c10 in FIG. 6).

The CSCF3 that has received the signal sends the provisional response of the 100 Trying to the MSC-IWF2 (outgoing side) (c11 in FIG. 6). The MSC-IWF2 (outgoing side) that has received the signal sends the Call Proceeding to the RNC1 (sending side) in response to the signal (c12 in FIG. 6). Accordingly, the flow of a signal is changed from that in the case of the existing third generation mobile phone service, disabling the mapping.

Figure 7:
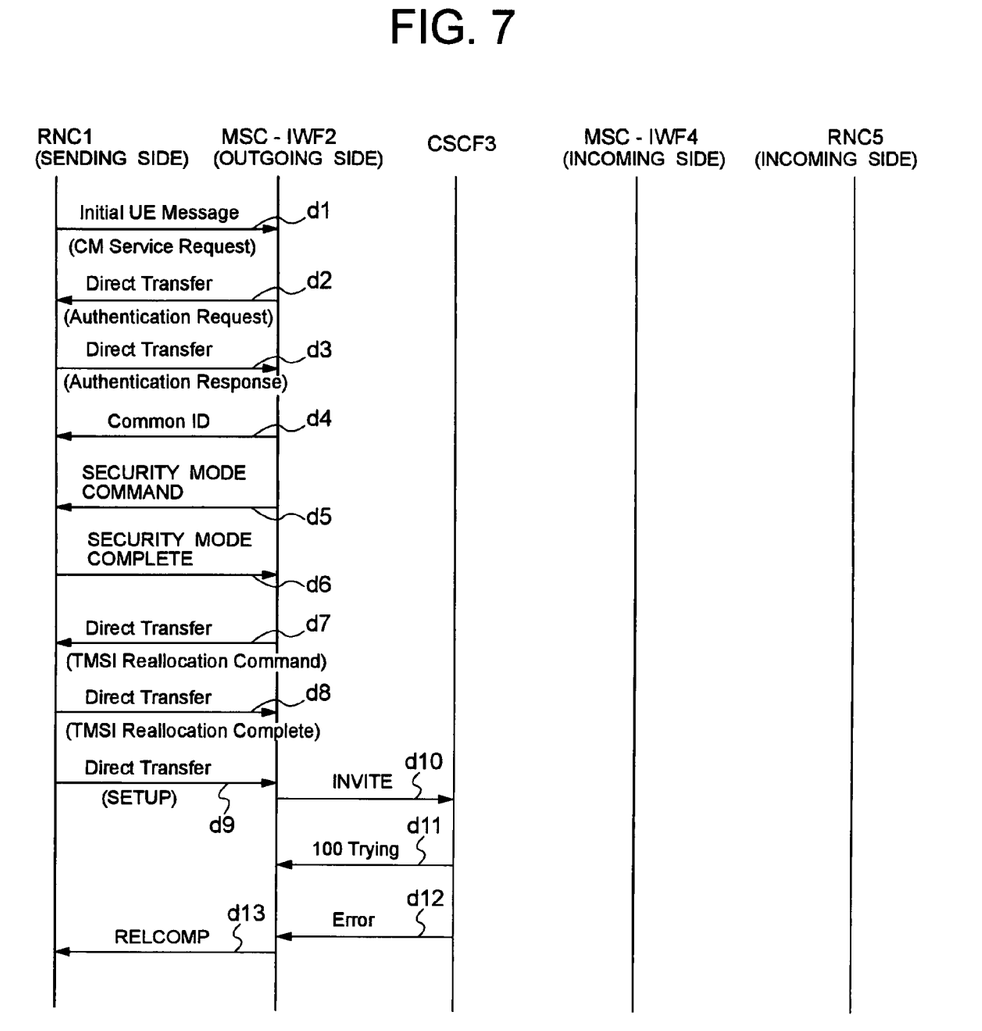
FIG. 7 is a sequence chart showing an SIP sequence by 183 signal determination at the CB and CLIR according to an exemplary embodiment of the present invention.

FIG. 7 is a sequence chart showing the SIP sequence by the 183 signal determination at the CB and CLIR according to an exemplary embodiment of the present invention. FIG. 7 shows the SIP sequence at the CB and CLIR when the Call Proceeding is sent in response to the 183 Session Progress.

Referring to FIG. 7, the SETUP signal is transferred from the RNC1 (sending side) to the MSC-IWF2 (outgoing side) as in the above-mentioned case (d9 in FIG. 7). Then, the INVITE signal is sent from the MSC-IWF2 (outgoing side) to the CSCF3 (d10 in FIG. 7).

The CSCF3 that has received the signal sends the provisional response of the 100 Trying to the MSC-IWF2 (outgoing side) (d11 in FIG. 7). As the CSCF3 detects the CB or a display rejection issuing state, it also sends the Error signal (d12 in FIG. 7). Accordingly, the RELCOMP signal is sent from the MSC-IWF2 (outgoing side) to the RNC1 (sending side) (d13 in FIG. 7) and the call is released.

Accordingly, the exemplary embodiment can be operated without causing a delay in the sending timing of the Call Proceeding in a normal-sequence signal by adding the response signal 1XX to an existing SIP sequence. As the Error signal is enabled to be sent before the Call Proceeding is sent also at the CB and CLIR, signal mapping between the signal protocol of the existing third generation mobile phone service and the SIP is enabled.

As mentioned above, although a normal sequence works in the existing SIP sequence without any problem, a semi-normal sequence such as the CB or CLIR cannot be mapped between the third generation mobile phone service and the SIP. In the sequence where the sending timing of the Call Proceeding is made at the 183 Session Progress, it can successfully operate at a semi-normal occasion such as the CB and CLIR, but a delay occurs in the normal occasion. Finally, in the SIP sequence according to the present invention, the CB and the CLIR services can be provided with no affection is made on an existing service whether it is at a normal occasion or a semi-normal occasion such as the CB and the CLIR.

As such, the exemplary embodiment enables signal mapping between a signal protocol of the third generation mobile phone service and the SIP even when a semi-normal-sequence signal is accepted by adding the response signal 1XX to the existing SIP sequence. In the exemplary embodiment, a delay needs not to be considered as in the case where the Call Proceeding is sent after the 183 Session Progress is sent with no response signal 1XX affecting the timing to send the normal Call Proceeding when the signal protocol is converted into the SIP.

Although the mobile communication service is set as the third generation mobile phone service in the above-mentioned exemplary embodiment, the present invention can also be applied to the case where the mobile communication service is the second generation mobile phone service or the GSM (Global System Mobile communication).

Second Exemplary Embodiment

Second exemplary aspect of the invention is a switching center server that performs interworking to provide an additional service for a mobile terminal belonging to the mobile communication network, including a converting means of converting a signal protocol in a service in the mobile communication network into an IP (Internet Protocol) based protocol.

Third Exemplary Embodiment

Third exemplary aspect of the invention is an additional service providing method in a mobile communication system including an IP (Internet Protocol) core network, a mobile communication network, a switching center server and a mobile terminal, wherein processing step of providing a plurality of services in each of the IP network and the mobile communication network for the mobile terminal, is included.

Fourth Exemplary Embodiment

In the conventional mobile communication system, in an existing SIP (session Initiation Protocol) sequence in a normal sequence, Call Proceeding is sent to the RNC (Radio Network Controller) from the MSC-IWF (Mobile Switching Center-Inter Working Function) after sending of the 100 trying (a provisional response indicating that it is being tried) from the CSCF (Call Session Control Function) to the MSC-IWF.

Fifth Exemplary Embodiment

On the other hand, in the present invention, a response signal 1XX (XX refers to any arbitrary number) is added and sent from the CSCF to the MSC-IWF after sending of the 100 trying, and after that the Call Proceeding is sent from the MSC-IWF to the RNC.

Sixth Exemplary Embodiment

Accordingly, in the mobile communication system of the present invention, the sending timing of the Call Proceeding that has been sent in response to the 100 Trying is synchronized with the reception of the response signal 1XX. In the CB (Cal Barring), CLIR (Calling Line Identification Restriction) services, the CSCF determines at receiving the INVITE signal [connection request (request to establish a session) and thereby an Error signal can be sent. Therefore, in the mobile communication system of the present invention, an existing signal protocol can be mapped to the SIP so that the above-mentioned problems can be solved.

Seventh Exemplary Embodiment

As shown in FIGS. 11 to 13, if the MSC-IWF receives the 183 Session Progress signal and changes to send the Call Proceeding to the RNC in a normal sequence, the MSC-IWF needs to done authentication, concealment, setting up and the like for a normal-sequence signal by the time when the MSC-IWF receives the 183 Session Progress, which causes a delay. The response signal 1XX does not affect the sending timing of the Call Proceeding, however, the above-mentioned problems can be solved.

Eighth Exemplary Embodiment

Further the MSC-IWF is adapted to have a function of converting a signal protocol used in the third generation mobile phone service received from the RNC into the SIP, and the CSCF that receives a signal converted from the MSC-IWF into the SIP is adapted to have functions of determining whether it is a normal sequence, or the CB or the CLIR, and sending the response signal 1XX or the Error signal to the MSC-IWF.

Ninth Exemplary Embodiment

Here, the MSC-IWF converts the signal protocol used in the third generation mobile phone service into the SIP used in the IMS (IP Multimedia Subsystem) network. The CSCF determines whether it is a normal sequence, or the CB or the CLIR based on the INVITE signal sent from the MSC-IWF, and if it is a normal sequence, it sends the response signal 1XX to the MSC-IWF; and if it detected the CB or the CLIR, it sends the Error signal.

Tenth Exemplary Embodiment

As mentioned above, the mobile communication system of the present invention can solve the above-mentioned problems by adding a new signal to the SIP sequence and adding a function to the IMS to implement the existing CB and CLIR services in the third generation mobile phone included in the IMS network, and to provide the CB and the CLIR services without affecting an existing service.

Eleventh Exemplary Embodiment

The present invention has an advantage for providing the CB and CLIR services without affecting the existing service by having the above-mentioned configuration and operations.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication system including an IP (Internet Protocol) core network, a mobile communication network, a switching center server and a mobile terminal, comprising: processing means of providing a plurality of services in each of said IP network and said mobile communication network for said mobile terminal, wherein said switching center server includes a function for converting a signal protocol from said mobile terminal to a SIP (Session Initiation Protocol), and said IP core network is an IMS (IP Multimedia Subsystem) network, and an SIP sequence adds a response signal for mapping a signal protocol of a service in said mobile communication network to be provided for said mobile terminal and an SIP signal of said IMS network, wherein in order to map said signal protocol and said SIP signal, if said SIP signal is determined to be a normal sequence, said response signal is added, and the switching center server that has received said response signal sends a Call Proceeding signal to said mobile terminal and confirms said normal-sequence signal.

2. The mobile communication system according to claim 1, wherein a difference between a CS (Circuited Switched) system of a service in said mobile communication network and an IP packet based SIP (Session Initiation Protocol) system is absorbed at said switching center server.

3. The mobile communication system according to claim 1, wherein the service in said mobile communication network is a third generation mobile phone service.

4. The mobile communication system according to claim 1, wherein said switching center server is an MSC-IWF (Mobile Switching Center-Inter Working Function).

5. The mobile communication system according to claim 1, wherein said response signal changes sending timing of said Call Proceeding signal and enables the existing signal protocol to said SIP signal to be mapped.

6. A switching center server that performs interworking to provide an additional service for a mobile terminal belonging to a mobile communication network, comprising a converting means of converting a signal protocol of a service in said mobile communication network into an IP (Internet Protocol) based protocol,
wherein a response signal for mapping a signal protocol of a service in said mobile communication network to be provided for said mobile terminal and a SIP (Session Initiation Protocol) signal of an IMS (IP Multimedia Subsystem) network is added, and
wherein in order to map said signal protocol and said SIP signal, if said SIP signal is determined to be a normal sequence said response signal is added, and when said response signal is received, the switching center server sends a Call Proceeding signal to said mobile terminal and confirms said normal-sequence signal.

7. The switching center server according to claim 6, wherein said converting means is to convert a signal protocol of a service in said mobile communication network into a SIP (Session Initiation Protocol).

8. The switching center server according to claim 7, wherein a difference between a CS (Circuited Switched) system of a service in said mobile communication network and an IP packet based SIP system is absorbed at said switching center server.

9. The switching center server according to claim 6, wherein the service in said mobile communication network is the third generation mobile phone service.

10. The switching center server according to claim 6, wherein said response signal changes sending timing of said Call Proceeding signal and enables the existing signal protocol to said SIP signal to be mapped.

11. An additional service providing method in a mobile communication system including an IP (Internet Protocol) core network, a mobile communication network, a switching center server and a mobile terminal, wherein the system comprises processing step of providing a plurality of services in each of said IP network and said mobile communication network for said mobile terminal,
wherein said IP core network is an IMS (IP Multimedia Subsystem) network, and a response signal for mapping a signal protocol of a service in said mobile communication network to be provided for said mobile terminal and a SIP (Session Initiation Protocol) signal of said IMS network is added, and
wherein in order to map said signal protocol and said SIP signal, if said SIP signal is determined to be a normal sequence, said response signal is added, and the switching center server that has received said response signal sends a Call Proceeding signal to said mobile terminal and confirms said normal-sequence signal.

12. The additional service providing method according to claim 11, wherein said switching center server absorbs a difference between a CS (Circuited Switched) system of a service in said mobile communication network and an IP packet based SIP (Session Initiation Protocol) system.

13. The additional service providing method according to claim 11, wherein a response signal for mapping a signal protocol of a service in said mobile communication network and the SIP (Session Initiation Protocol) signal of said IMS network is added.

14. The additional service providing method according to claim 13, wherein the service in said mobile communication network is the third generation mobile phone service.

15. The additional service providing method according to claim 11, wherein said response signal changes sending timing of said Call Proceeding signal and enables the existing signal protocol to said SIP signal to be mapped.

* * * * *